(12) United States Patent
Taniguchi et al.

(10) Patent No.: US 8,563,162 B2
(45) Date of Patent: Oct. 22, 2013

(54) SEALED BATTERY (75) Inventors: Yasutomo Taniguchi, Moriguchi (JP);
Kenji Nansaka, Moriguchi (JP);
Yasuhiro Yamauchi, Moriguchi (JP);
Toshiyuki Nohma, Moriguchi (JP)

(73) Assignee: SANYO Electric Co., Ltd.,
Moriguchi-shi, Osaka (JP)

( * ) Notice: Subject to any disclaimer, the term of this patent is extended or adjusted under 35 U.S.C. 154(b) by 0 days.

(21) Appl. No.: 13/590,666

(22) Filed: Aug. 21, 2012

(65) Prior Publication Data

US 2012/0315526 A1   Dec. 13, 2012

Related U.S. Application Data

(63) Continuation of application No. 12/237,610, filed on Sep. 25, 2008, now Pat. No. 8,257,861.

(30) Foreign Application Priority Data

Sep. 28, 2007  (JP) ................................. 2007-254715

(51) Int. Cl.
*H01M 6/42* (2006.01)
*H01M 6/46* (2006.01)

(52) U.S. Cl.
USPC .............................. 429/161; 429/94; 429/211

(58) Field of Classification Search
USPC .................................. 429/94, 161, 185, 211
See application file for complete search history.

(56) References Cited

U.S. PATENT DOCUMENTS

| 2007/0117009 A1 | 5/2007 | Yamauchi et al. |
| 2009/0004561 A1 | 1/2009 | Nansaka et al. |
| 2010/0203371 A1 | 8/2010 | Nagai et al. |

FOREIGN PATENT DOCUMENTS

| JP | 2000-133241 A | 5/2000 |
| JP | 2001-160387 A | 6/2001 |
| JP | 2002-008708 A | 1/2002 |
| JP | 2005-203374 A | 7/2005 |
| JP | 2006-310254 A | 11/2006 |
| JP | 2006-310267 A | 11/2006 |
| JP | 2007-053002 A | 3/2007 |

*Primary Examiner* — Gregg Cantelmo
(74) *Attorney, Agent, or Firm* — Westerman, Hattori, Daniels & Adrian, LLP

(57) ABSTRACT

A sealed battery including: an electrode assembly 11 having multiple positive electrode substrates exposed at one end and negative electrode substrates exposed at the other end; and collectors $18_1$ and collector receiving parts $18_3$ that are resistance-welded on both sides of the multiple positive or the multiple negative electrode substrates or both, grooves 23 being formed around the resistance-welded portion of at least one of the collector $18_1$ and the collector receiving part $18_3$. Due to the spattered particles 26 generated during the resistance-welding being captured within the grooves 23, few particles burst into the inside of the electrode assembly 11 or into the outside.

5 Claims, 5 Drawing Sheets

SEALED BATTERY

CROSS-REFERENCE TO RELATED APPLICATIONS

This Application is a Continuation of application Ser. No. 12/237,610 filed on Sep. 25, 2008, now U.S. Pat. No. 8,257,861. Application Ser. No. 12/237,610 claims priority for Application 2007-254715 filed on Sep. 28, 2007 in Japan.

TECHNICAL FIELD

The present invention relates to a sealed battery. More particularly it relates to a sealed battery which has exposed portions of positive electrode substrates at one end of an electrode assembly for the sealed battery and of negative electrode substrates at the other end, and which has high-reliability with low occurrence of internal short-circuits, since the movement of spattered particles into the interior of the electrode assembly when collectors are resistance-welded to the substrates is prevented.

BACKGROUND ART

Curbs on emissions of carbon dioxide and other substances have been strengthened against a background of a growing environmental protection movement, and in the automobile world there is now vigorous development of electric vehicles (EVs) and hybrid electric vehicles (HEVs) alongside vehicles using fossil fuels such as gasoline, diesel oil and natural gas. In addition, the soaring price of fossil fuels in recent years has acted to spur on the development of EVs, HEVs and the like.

The batteries used for such EVs, HEVs and the like are generally nickel-hydrogen secondary batteries or lithium ion secondary batteries. However, what is now required of such vehicles is not only environmental friendliness, but also basic performance as an automobile, in other words, superior driving capabilities. Therefore, it is necessary not simply to enlarge the battery capacity, but also to increase the battery output, which exerts large effects on an automobile's acceleration and hill-climbing performance. However, when a high output is discharged, a large current flows in the battery, and as a result there is a large increase in heat due to contact resistance between the substrates and the collectors, which are the generation elements. Thus, batteries for EVs and HEVs are required not only to be large-sized and large capacity, but also to handle a large current. Accordingly, in order to prevent electricity loss inside the battery and thereby reduce heat emission, many improvements have been carried out with regard to lowering the internal resistance by preventing welding faults between the substrates and collectors, which are the generation elements.

There exist the methods of mechanical caulking, welding and the like for electrically joining the substrates and collectors, which are the generation elements. Welding, which is joining by fusion, is appropriate as the electrical collection method for batteries of which high output is required. Also, in order to effect low resistance, the material used for the negative electrode assembly of a lithium ion secondary battery is copper or copper alloy, which however have the characteristics of low electrical resistance and high thermal conductivity, so that an extremely large amount of energy is required in order to weld them.

The following methods have long been known as methods for welding together the substrates and collectors which are the generation elements:
1) Laser welding (see JP-A-2001-160387)
2) Ultrasonic welding (see JP-A-2007-053002)
3) Resistance welding (see JP-A-2006-310254)

With the laser welding method, a high-energy laser beam is required because the reflectivity of the copper or copper alloy welded material with respect to the YAG (yttrium-aluminum garnet) laser light that is widely used to weld metals is high—around 90%. There also exist the problems that when copper or copper alloy is laser-welded, the weldability varies greatly depending on the condition of the surfaces, and that the occurrence of spattering is unavoidable, as in laser welding of other materials.

Ultrasonic welding also requires a large amount of energy, because the thermal conductivity of the copper or copper alloy welded material is high. Also, the negative electrode activate material may be dislodged by the ultrasonic vibration during welding. Accordingly, in the invention disclosed in JP-A-2007-053002, the electrode assembly, which is the generation element, is compressed during ultrasonic welding, so that dislodged negative electrode active material will not enter inside it.

Further, with resistance welding, due to the copper or copper alloy welded material having low electrical resistance and high thermal conductivity there exist the problems that large current needs to be input in a short time, that fusion-joining of the collectors and the electrode poles, which are of the same material as the collectors, sometimes occurs during welding, and that melting or spark generation may occur at places other than the welds.

Thus, the three welding methods have their merits and drawbacks. In the interests of productivity and economy however, the resistance welding method, which has long been used as a method for welding between metals, will preferably be employed. However, especially in order to resistance-weld the copper collectors to the substrates of copper or copper alloy in the electrode assembly (see JP-A-2002-008708) of sealed batteries for EV and HEV application, which have exposed portions of positive electrode substrates at one end and of negative electrode substrates at the other, a great deal of welding energy is necessary in order to effect a firm weld, since the electrode assembly has a large number of stacked layers. Moreover, when the welding energy is rendered large for resistance welding, the generation of spattered particles is increased and there is increased such a probability that the particles move into the inside of the electrode assembly, so that the internal short circuit is caused.

SUMMARY

An advantage of some aspects of the present invention is to provide a sealed battery which has exposed portions of positive electrode substrates at one end of an electrode assembly for the sealed-battery and of negative electrode substrates at the other end, and which is high-reliability with low occurrence of internal short-circuits, since the movement of spattered particles into the interior of the electrode assembly when collectors are resistance-welded to the substrates is prevented.

According to an aspect of the present invention, a sealed battery includes an electrode assembly having multiple positive electrode substrates exposed at one end and multiple negative electrode substrates exposed at the other end, and collectors and collector receiving parts that are resistance-welded on both sides of at least one of the multiple positive electrode substrates and the multiple negative electrode substrates, a groove being formed around a resistance-welded portion of at least one of the collectors and the collector receiving parts.

The sealed battery according to the present aspect needs to have an electrode assembly for a sealed-battery having multiple positive electrode substrates exposed at one end and negative electrode substrates exposed at the other end, and collectors and collector receiving parts that are resistance-welded on both sides of at least one of the multiple positive electrode substrates and the multiple negative electrode substrates. Typically, with such a sealed battery, a large amount of welding energy has to be applied in order to effect firm welding, since the electrode assembly has a large number of stacked layers. Further, during resistance welding, an increased amount of spattered particles are generated.

However, with the sealed battery of the above-described arrangement, since a groove is formed around the resistance-welded portion of at least any one of the collectors and the collector receiving parts, spattered particles generated during resistance welding fall within and are captured in the groove, and thus such particles rarely disperse to the interior or exterior of the electrode assembly. Therefore, with the above-described arrangement, a highly reliable sealed battery is obtained with low occurrence of internal short-circuits.

The substrates, collectors, and collector receiving parts in the sealed battery with the above-described arrangement may all be formed of the same metal or differing metals, and this applies equally well both to the positive electrode substrates and to the negative electrode substrates. Further, provided that the sealed battery of this arrangement is equipped with an electrode assembly for a sealed battery having positive electrode substrates exposed at one end and negative electrode substrates exposed at the other end, and with collectors and collector receiving parts that are disposed opposing each other and resistance-welded on both sides of at least one of the positive and the negative electrode substrates, the electrode assembly may be of the wound type or the stacked type, and moreover the battery may be a nonaqueous or aqueous electrolyte secondary battery.

With the sealed battery of the above-described arrangement, it is preferred that a flat-surfaced salient projecting toward the other of the collectors and the collector receiving parts be provided on at least one of the collectors and the collector receiving parts, insulating tapes be provided around the flat-surfaced salient with an interval, and the groove be formed between the flat-surfaced salient and the insulating tape.

Since the groove formed in the collectors or the collector receiving parts of the sealed battery of the present invention functions as a space for capturing particles generated by spattering, portions other than the resistance-welded portion are not necessarily formed with the same material as the material of the collectors or the collector receiving parts. Further, during resistance welding, current is passed for only a brief time, and moreover, flows over a narrow extent, so that the insulating tapes are rarely all melted at the same time. Therefore, the spattered particles that are generated during resistance welding will rarely splash from the insulating tapes and enter inside the electrode assembly. With the sealed battery of this structure, the groove can be formed simply by providing insulating tape around a flat-surfaced salient formed on the collectors or the collector receiving parts, whereby a sealed battery exhibiting the foregoing advantageous effect of the present invention can be easily produced. Here, the insulating tapes can be appropriately selected from insulating tapes having an adhesive such as polyimide tapes, polypropylene tapes and polyphenylene sulfide tapes; rubber-based sealing materials; and insulating tapes composed of insulating thermodepositing resins such as acid-modified polypropylenes and polyolefin-based thermodepositing resins to be used.

With the sealed battery of the above-described arrangement, it is preferred that the groove be formed in one of the collectors and the collector receiving parts which are on a current receiving side.

The resistance welding is performed by placing a matter to be welded on the electrode pole of one side and by passing current while pushing the electrode pole of the other side to the matter to be welded, and the electrode pole of the one side on which the matter to be welded is placed is the current receiving side. Then, the spattering generated during the resistance welding is likely to be generated on the current receiving side at which the contact resistance becomes larger. Therefore, when the groove is formed on the current receiving side among the collectors and the collector receiving parts, the particles generated by the spattering during the resistance-welding are advantageously captured within the groove, so that a highly reliable sealed battery with low occurrence of internal short-circuits can be obtained.

With the sealed battery of the above-described arrangement, it is preferred that, on the resistance-welded portion of at least one of the collectors and the collector receiving parts, a protuberance that projects toward the other of the collectors and the collector receiving parts be provided.

The protuberance, generally termed a "projection", will preferably have a tip portion whose cross-sectional area is smaller than that of the base portion. Since current will concentrate in the tip portion of the protuberance during resistance welding, reactive current not used in resistance welding is reduced, and resistance welding can be carried out effectively and robustly even if the electrical resistance of the substrates, collectors, and collector receiving parts is low and their thermal conductivity is high. Therefore, with this arrangement, a sealed battery is obtained with high weld reliability as well as the foregoing advantages of the above-described arrangement.

With the sealed battery of the above-described arrangement, it is preferred that, on the resistance-welded portion of one of the collectors and the collector receiving parts, the protuberance that projects toward the other of the collectors and the collector receiving parts be provided, and the groove be formed at a position in the other of the two items corresponding to an area around the protuberance.

When the protuberance is provided on one of the collectors and the collector receiving parts, the contact resistance between the protuberance and the substrates of the electrode assembly becomes smaller than that in the case where no such protuberance is provided. Accordingly, since spattering is frequently generated in the other of the collectors and the collector receiving parts on which no protuberance is provided during the resistance-welding, if the groove is formed in the other, the particles generated by the spattering are advantageously captured in the groove. Therefore, with this arrangement, a highly reliable sealed battery with low occurrence of internal short-circuits can be obtained.

With the sealed battery of the above-described arrangement, it is preferred that the groove be formed in a ring shape having a width of 1 mm to 9 mm, a depth of 0.5 mm to 2 mm, and an inner diameter of 4 mm to 20 mm.

Typical particles spattered during the resistance welding have a diameter of around a few micrometers to a few millimeters. Accordingly, when the groove has a width of 1 mm or more, the capturing effect of the particles spattered during the resistance welding becomes advantageous, and when the groove has a width of 9 mm or less, the collectors and the collector receiving parts can be down-sized, which is preferred. In addition, when the groove has a depth of 0.5 mm or more, the capturing effect of the particles spattered during the resistance welding becomes advantageous, and when the groove has a depth of 2 mm or less, the collectors and the collector receiving parts can be made thinner, which is preferred. Further when the groove formed in a ring shape has an inner diameter of 4 mm or more, it is sufficiently larger than the size of a molten portion (nugget) caused by the resistance welding, so that the effect of providing the groove is easily exhibited, and further, when the groove formed in a ring shape has an inner diameter of 20 mm or less, the collectors and the collector receiving parts can be down-sized, which is preferred.

With the sealed battery of the above-described arrangement, it is preferred that all of the resistance-welded substrates, collectors, and collector receiving parts be made of copper or a copper alloy.

Copper and copper alloys have the lowest electrical resistance and the highest thermal conductivity among the commonly-used conductive metals, and therefore generate a large amount of spattered particles during resistance welding, which requires a large current to be passed. However, with the sealed battery of the above-described arrangement, a large amount of spattered particles generated will be captured in the groove around the resistance-welded portion, whereby the foregoing advantages of the above-described arrangement will be satisfactorily exhibited.

BRIEF DESCRIPTION OF THE DRAWINGS

The invention will be described with reference to the accompanying drawings, in which the same numerals refer to the same elements throughout.

DESCRIPTION OF EXEMPLARY EMBODIMENTS

Exemplary embodiments of the invention will now be described with reference to the accompanying drawings and to working examples and a comparative example. It should be understood however that the embodiments below are intended by way of illustrative examples of methods for manufacturing a prismatic nonaqueous electrolyte secondary battery, as an instance of a sealed battery, that carry out the technical concepts of the invention, and are not intended by way of limiting the invention to these particular manufacturing methods for a prismatic nonaqueous electrolyte secondary battery. The invention could equally well be applied to yield other embodiments within the scope and spirit of the claims.

Figure 1A:
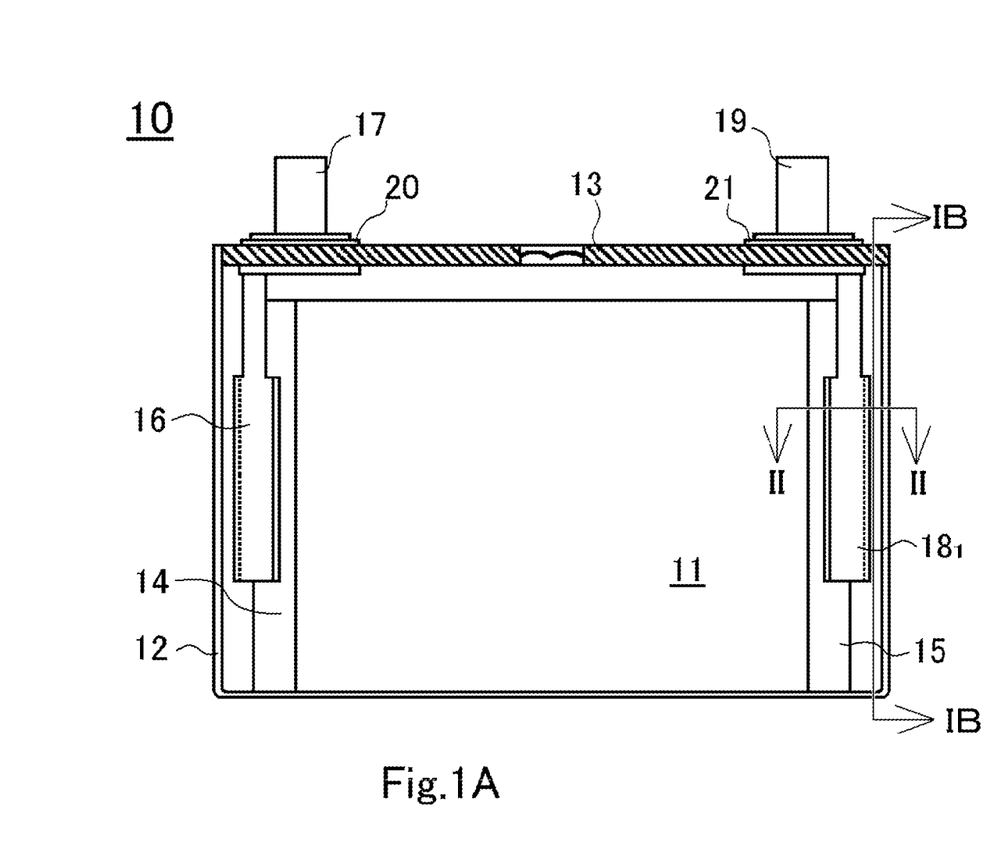
FIG. 1A is a front view illustrating the internal structure of a prismatic battery.
Figure 1B:
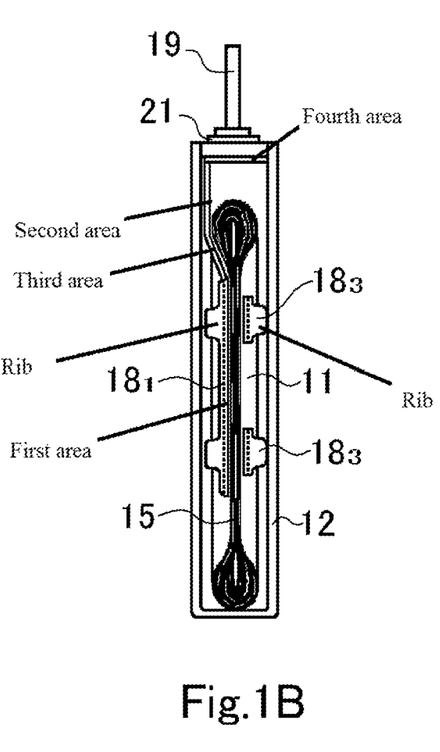
FIG. 1B is a cross sectional view along line IB-IB in FIG. 1A.
Figure 2:
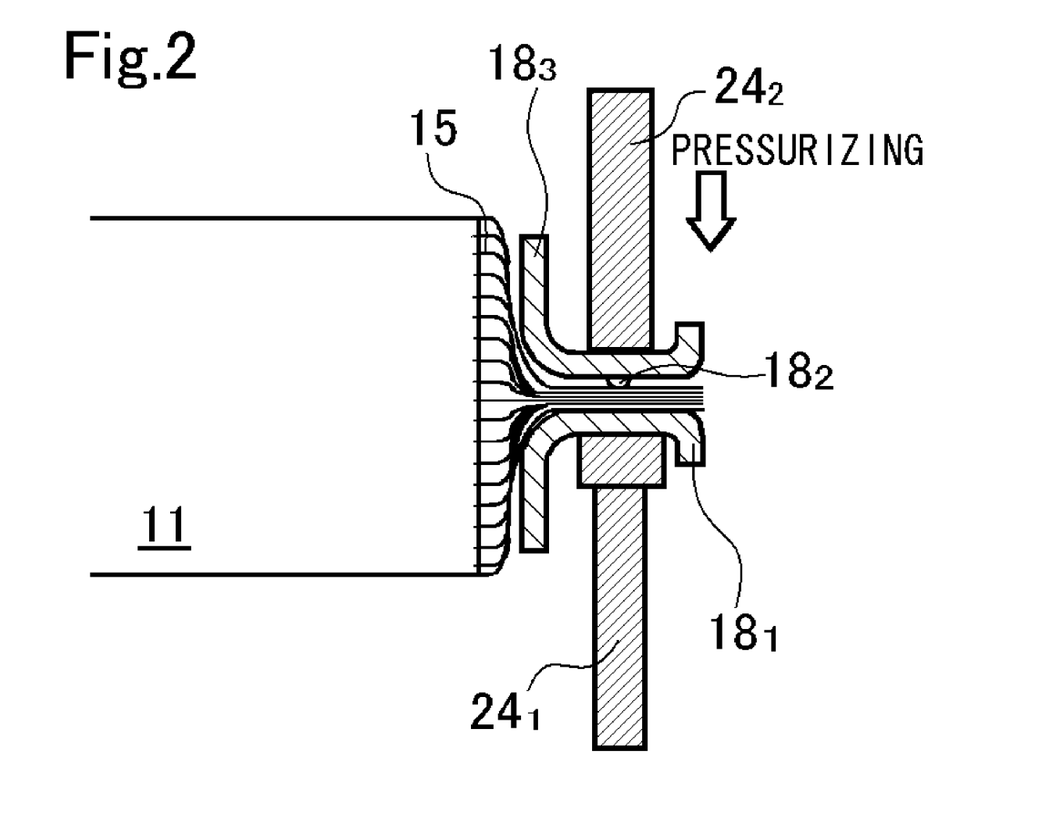
FIG. 2 is a cross sectional view along line II-II in FIG. 1A, which describes a resistance-welding method.
Figure 3:
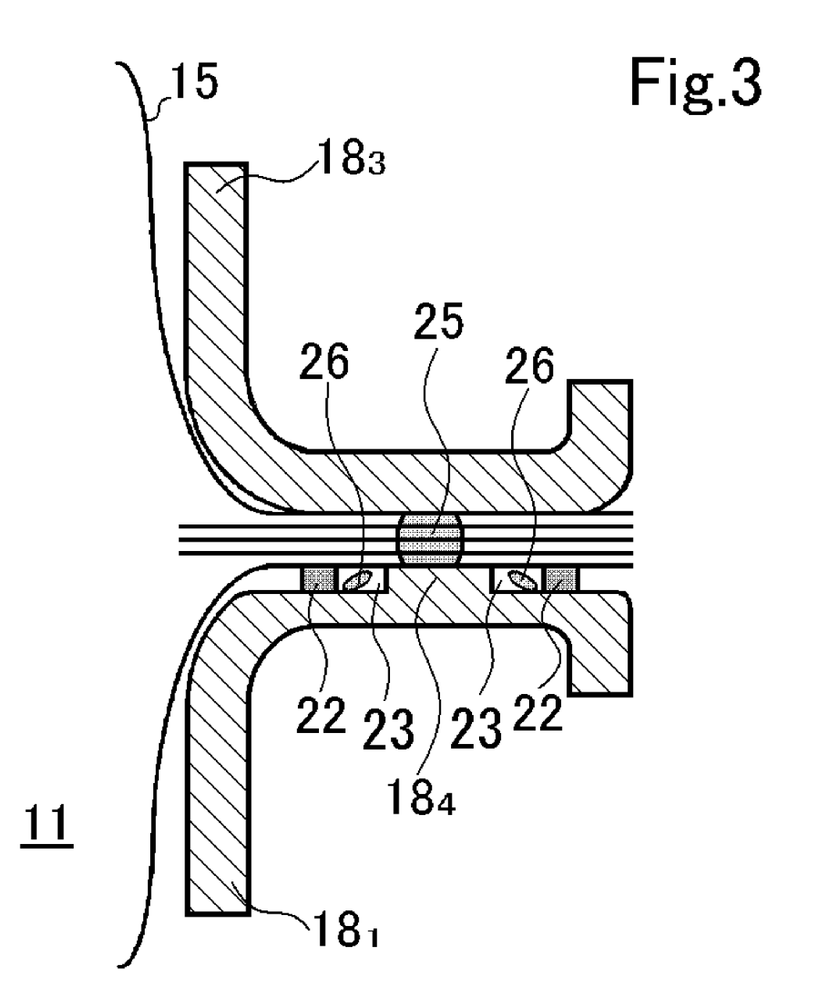
FIG. 3 is an enlarged cross-sectional view, corresponding to FIG. 2, of the prismatic battery in the first and second working examples.
Figure 4:
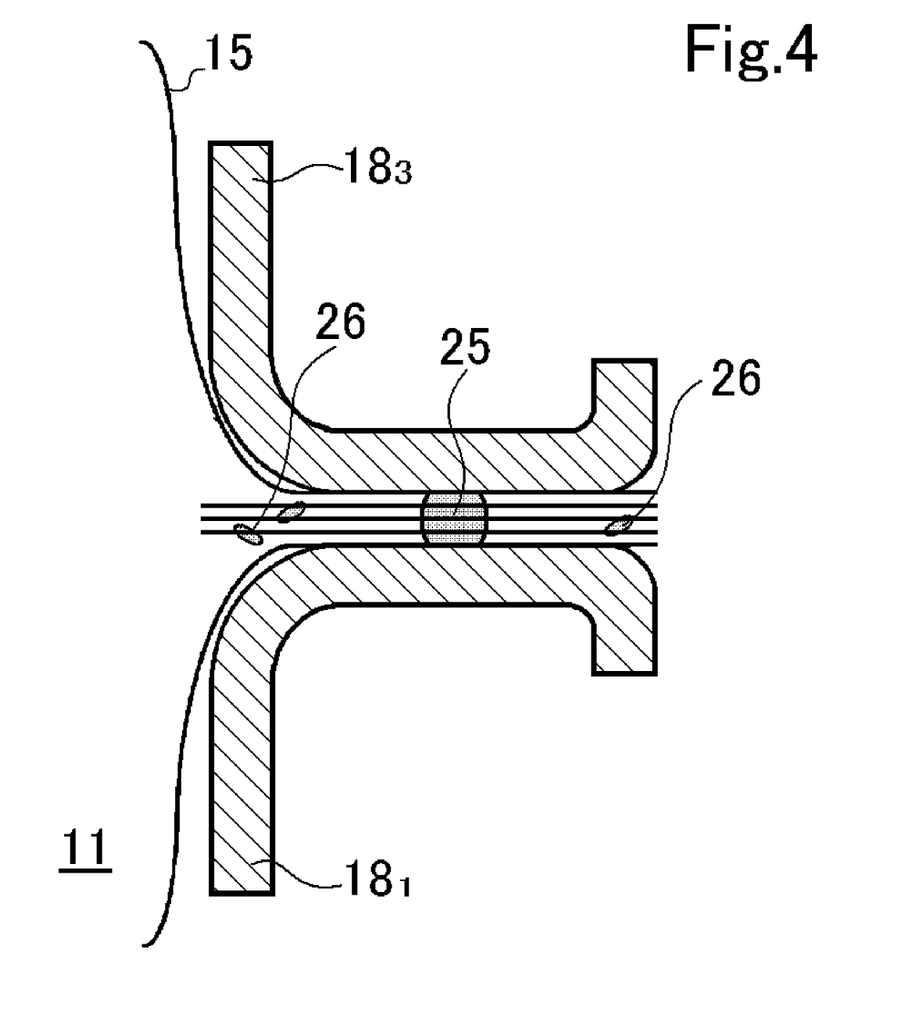
FIG. 4 is an enlarged cross-sectional view, corresponding to FIG. 2, of the prismatic battery in the comparative example.
Figure 5:
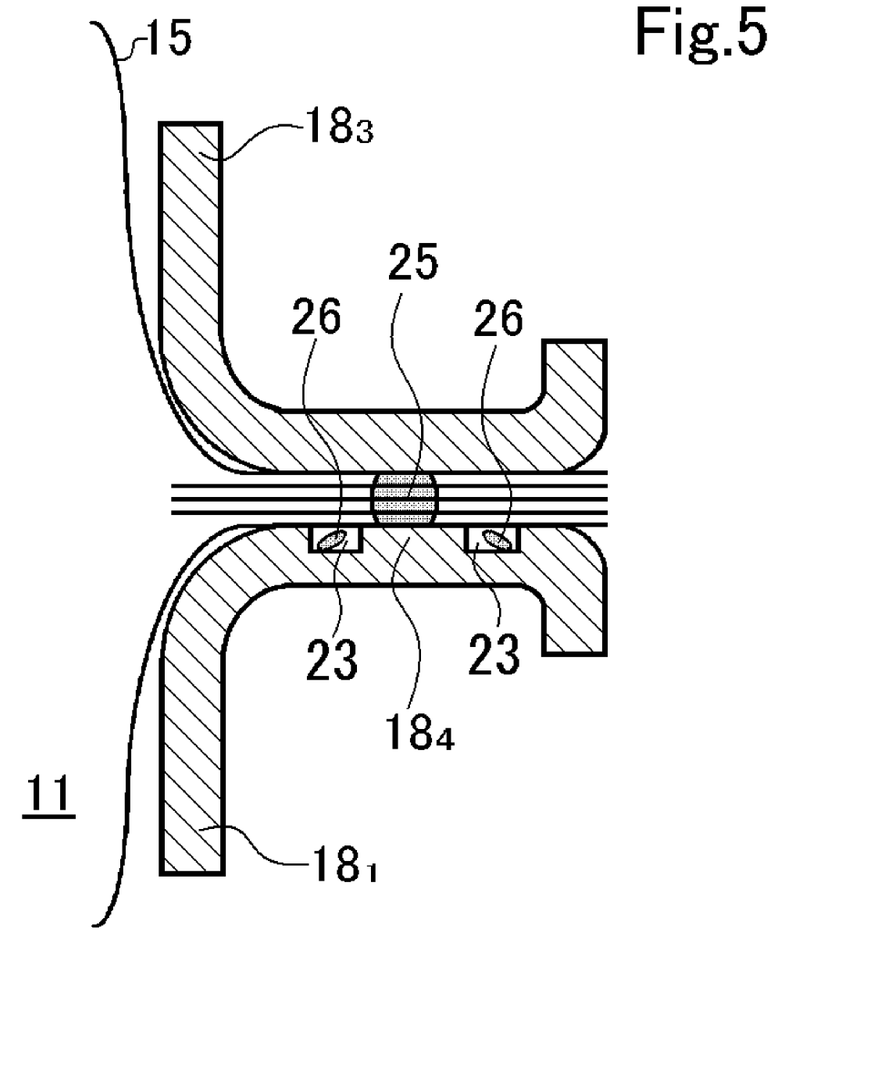
FIG. 5 is an enlarged cross-sectional view, corresponding to FIG. 2, of a variant of the prismatic battery in the working examples.

FIG. 1A is a front view illustrating the internal structure of a prismatic battery, and FIG. 1B is a cross sectional view along line IB-IB in FIG. 1A. FIG. 2 is a cross sectional view along line II-II in FIG. 1A, which describes a resistance-welding method. FIG. 3 is an enlarged cross-sectional view, corresponding to FIG. 2, of the prismatic battery in the first and second working examples. FIG. 4 is an enlarged cross-sectional view, corresponding to FIG. 2, of the prismatic battery in the comparative example. FIG. 5 is an enlarged cross-sectional view, corresponding to FIG. 2, of a variant of the prismatic battery in the working examples.

First of all a prismatic nonaqueous electrolyte secondary battery that is as an instance of a sealed battery and is common to both the working examples and the comparative example will be described using FIGS. 1A and 1B. In this nonaqueous electrolyte secondary battery 10, a flat wound electrode assembly 11, which is made up of positive electrode plates (not shown in the drawings) and negative electrode plates (not shown in the drawings) wound with separators (not shown in the drawings) interposed, is housed inside a rectangular outer can 12, and the outer can 12 is sealed by a sealing plate 13.

The flat wound electrode assembly 11 has, at one end in the winding axis direction, positive electrode substrate exposed portions 14 over which positive electrode binder is not spread, and at the other end, negative electrode substrate exposed portions 15 over which negative electrode binder is not spread. The positive electrode substrate exposed portions 14 are connected to a positive electrode terminal 17 via a positive electrode collector 16 and the negative electrode substrate exposed portions 15 are connected to a negative electrode terminal 19 via a negative electrode collector $18_1$. The positive electrode terminal 17 and the negative electrode terminal 19 are fixed to the sealing plate 13 via insulating members 20 and 21 respectively.

As shown in FIG. 1B, the negative electrode collector is comprised of first, second and third area. A first area of the negative electrode collector is approximately parallel with and welded to one outermost surface of the narrow part of the wound negative electrode substrate exposed portion. A second area of the negative electrode collector is approximately parallel with a side wall of the rectangular outer can, and between the wound negative electrode substrate exposed portion and a side wall of the rectangular outer can. The second area is extended to be closer to the sealing plate than is the end of the wound negative electrode substrate exposed portion which is closest to the sealing plate. The second area is closer to a side of the side wall of the rectangular outer can than is the first area. A third area of the negative electrode collector connects the first area with the second area. A rib is formed in the first area of the negative electrode collector and at an end of a central side of the wound electrode assembly. The negative electrode collector includes a fourth area approximately parallel with the sealing plate.

To fabricate this prismatic nonaqueous electrolyte secondary battery, the flat wound electrode assembly 11 is inserted into the outer can 12, then the sealing plate 13 is laser-welded over the mouth portion of the outer can 12, after which the nonaqueous electrolyte is poured in through an electrolyte pour hole (not shown in the drawings) and the electrolyte pour hole is sealed up. Examples of an electrolyte which can be used include a solution of ethylene carbonate and diethyl carbonate mixed in the proportion 3:7 by volume, into which 1 mole/L of $LiPF_6$ is dissolved to produce a nonaqueous electrolyte.

Next is described the specific manufacturing method for the flat wound electrode assembly 11, which is common to both the working examples and the comparative example.

Fabrication of Positive Electrode Plates

The positive electrode plates are fabricated as follows. First of all, lithium cobalt oxide ($LiCoO_2$) powder serving as the positive electrode active material, carbon-based powder such as acetylene black or graphite serving as the conducting material, and binding agent constituted of polyvinylidene-fluoride (PVdF) are mixed in the proportions 94%, 3% and 3% by mass. Then an organic solvent constituted of N-methyl-2-propylene (NMP) is added to the resulting mixture and stirred in to form a positive electrode active material slurry. Next, a positive electrode substrate constituted of aluminum foil (say 20 μm thick) is prepared, and the positive electrode active material slurry made in the foregoing manner is applied evenly over both surfaces of the positive electrode substrate to form positive electrode active material mixture layers. The positive electrode active material is applied in such a manner that in the positive electrode active material mixture layer on one surface, a bare portion (positive electrode substrate exposed portion) of a particular width (12 mm in this example) where the slurry is not applied is formed along the edge of the positive electrode substrate. After that, the positive electrode substrate with the positive electrode active material mixture layers formed thereon is passed through a drier, where the NMP that was needed during fabrication of the slurry is removed and the substrate is dried. After such drying, the substrate is rolled in a roll press into a positive electrode plate of thickness 0.06 mm. The positive electrode plate thus fabricated is then cut into a strip 100 mm wide, so that a positive electrode plate is obtained that is provided with a 10 mm wide strip-form exposed portion of aluminum positive electrode substrate.

Fabrication of Negative Electrode Plates

The negative electrode plates are fabricated as follows. First of all, natural graphite powder serving as the negative electrode active material, and carboxymethyl cellulose (CMC) and styrene-butadiene rubber (SBR) serving as binding agents, are mixed in the proportions 98%, 1% and 1% by mass. Then water is added and the mixture is stirred to produce a negative electrode active material slurry. Next, a negative electrode substrate constituted of copper foil (say 12 μm thick) is prepared, and the negative electrode active material slurry made in the foregoing manner is applied evenly over both surfaces of the negative electrode substrate to form negative electrode active material mixture layers. The negative electrode active material is applied in such a manner that in the negative electrode active material mixture layer on one surface, a bare portion (negative electrode substrate exposed portion) of a particular width (10 mm in this example) where the slurry is not applied is formed along the edge of the negative electrode substrate. After that, the negative electrode substrate with the negative electrode active material mixture layers formed thereon is passed through a drier and dried. After such drying, the substrate is rolled in a roll press into a negative electrode plate of thickness 0.05 mm. The negative electrode plate thus fabricated is then cut into a strip 110 mm wide, so that a negative electrode plate is obtained that is provided with an 8 mm wide strip-form exposed portion of negative electrode substrate.

Fabrication of Wound Electrode Assembly

First, the positive electrode substrate exposed portions of the positive electrode plates, and negative electrode substrate exposed portions of the negative electrode plates, that were obtained in the foregoing manner, are displaced so as not to overlie the electrode active material layers that are respectively opposed to them, and then the electrode plates are wound, with porous polyethylene separators (0.022 mm thick and 100 mm wide) interposed, to produce a flat wound electrode assembly 11 which has multiple positive electrode substrate exposed portions 14 constituted of aluminum foil formed at one end and negative electrode substrate exposed portions 15 constituted of copper foil at the other, and which is used in the working examples and the comparative example.

Resistance Welding of Collectors

A positive electrode collector 16 and a positive electrode collector receiving part (not shown in the drawings) made of aluminum are attached by resistance welding to the positive electrode substrate exposed portions 14 of the flat wound electrode assembly 11 fabricated in the foregoing manner, and likewise, a negative electrode collector $18_1$ and a negative electrode collector receiving part $18_3$ made of copper are attached by resistance welding to the negative electrode substrate exposed portions 15. The attachment of the negative electrode collector $18_1$ and negative electrode collector receiving part $18_3$ made of copper to the negative electrode substrate exposed portions 15 by resistance welding will now be described.

In the case where the copper-made negative electrode collector $18_1$ and negative electrode collector receiving part $18_3$ are attached to the negative electrode substrate exposed part 15 by a resistance-welding, as shown in FIG. 2, the negative electrode collector $18_1$ is placed on an electrode pole $24_1$ of which bottom part is fixed and further, the negative electrode collector receiving part $18_3$ is placed thereon through the negative electrode substrate exposed part 15. Next, an upper electrode pole $24_2$ is placed on the negative electrode collector receiving part $18_3$, and by pushing the electrode pole $24_2$ to the negative electrode collector receiving part $18_3$ with a pressuring force predetermined experimentally beforehand and by passing a predetermined resistance-welding current, the resistance-welding is performed. In FIG. 2, shown is an instance in which the negative electrode collector receiving part $18_3$ in which a protuberance $18_2$ functioning as a projection is provided was used.

Thus, after the copper-made negative electrode collector $18_1$ and negative electrode collector receiving part $18_3$ are attached to the negative electrode substrate exposed part 15 by a resistance-welding, separately a positive electrode collector and a positive electrode collector receiving part are attached to a positive electrode collector exposed part, a prismatic nonaqueous electrolyte secondary battery as the sealed battery is assembled as described above.

Next, as the first and second working examples and the comparative example, the difference in the effect between the case where the grooves of the present invention are formed in the negative electrode collector $18_1$ or the negative electrode collector receiving part $18_3$ (the first and second working examples) and the case where the grooves are not formed in them (the comparative example) was confirmed.

FIRST WORKING EXAMPLE

In the first working example, as shown in FIG. 2, a copper-made negative electrode collector receiving part $18_3$ in which a tapered protuberance $18_2$ (having a height of 0.8 mm and a diameter of the bottom part of 2 mm) functioning as a projection is formed in the central part thereof, was used. Then, as shown in FIG. 3, a copper-made negative electrode collector $18_1$ in which a flat-surfaced protuberance $18_4$ in a columnar shape having a diameter of 4 mm and a height of 0.5 mm is formed in the central part thereof was used. Surrounding the flat-surfaced protuberance $18_4$ and departing from the protuberance $18_4$ by 1 mm, an insulating tape layer 22 having a thickness of about 0.5 mm produced by laminating insulating tapes (a polypropylene tape in which the substrate is made-of polypropylene tape and an adhesive is rubber based) having a thickness of 40 μm was adhered. That is, a groove 23 formed in the negative electrode collector $18_1$ of the first working example has a groove diameter of 4 mm, a groove width of 1 mm and a groove depth of 0.5 mm.

In the above-described state, by performing the resistance-welding as described above, it was inspected visually whether the spattered particles splash out to the outside or not. Further, after the resistance-welding, by peeling compellingly the negative electrode collector $18_1$ and the negative electrode collector receiving part $18_3$ from the negative electrode substrate exposed part 15, it was also inspected visually whether the spattered particles are captured within the groove 23 or not and whether the spattered particles splash to the electrode assembly 11 side or not. The results of the inspections are summarized in Table 1. Here, FIG. 3 shows schematically the form of a molten portion 25 formed at the resistance-welded portion after the resistance-welding and the existing state of spattered particles 26.

SECOND WORKING EXAMPLE

In the second working example, the same negative electrode collector receiving part $18_3$ as that used in the first working example was used. Then, a copper-made negative electrode collector $18_1$ in which a flat-surfaced protuberance $18_4$ in a columnar shape having a diameter of 20 mm and a height of 2 mm is formed in the central part thereof was used. Like in the first working example, surrounding the flat-surfaced protuberance $18_4$ and departing from the protuberance $18_4$ by 9 mm, an insulating tape layer having a thickness of about 2 mm produced by laminating the same insulating tapes as those in the first working example was adhered. That is, a groove 23 formed on the negative electrode collector $18_1$ of the second working example has a groove diameter of 20 mm, a groove width of 9 mm and a groove depth of 2 mm.

In the above-described state, by performing the resistance-welding as described above, it was inspected visually whether the spattered particles splash to the outside or not. Further, after the resistance-welding, by peeling compellingly the negative electrode collector $18_1$ and the negative electrode collector receiving part $18_3$ from the negative electrode substrate exposed part 15, it was also inspected visually whether the spattered particles are captured within the groove 23 or not and whether the spattered particles splash to the electrode assembly 11 side or not. The results of the inspections are summarized in Table 1. Here, FIG. 3 shows schematically the form of a molten portion 25 formed at the resistance-welded portion after the resistance-welding and the existing state of spattered particles 26, with proviso that the size of each part shown in FIG. 3 is different from that in the second working example.

COMPARATIVE EXAMPLE

In the comparative example, the resistance-welding was performed using the same negative electrode collector receiving part $18_3$ as that used in the first working example and a copper-made flat-surfaced negative electrode collector $18_1$ as shown in FIG. 4. In the above-described state, by performing the resistance-welding as described above, it was inspected visually whether the spattered particles splash to the outside or not. Further, after the resistance-welding, by peeling compellingly the negative electrode collector $18_1$ and the negative electrode collector receiving part $18_3$ from the negative electrode substrate exposed part 15, it was also inspected visually whether the spattered particles are captured within the groove 23 or not and whether the spattered particles splash to the electrode assembly 11 side or not. The results of the inspections are summarized in Table 1. Here, FIG. 4 shows schematically the form of a molten portion 25 formed at the resistance-welded portion after the resistance-welding and the existing state of spattered particles 26.

TABLE 1

| | Size of groove* (diameter × width × depth) | Generation of spattered particles | Capture of particles in groove | Splash of particles to the outside and into the inside of electrode assembly |
|---|---|---|---|---|
| First Embodiment | 4 × 1 × 0.5 | present | present | none |
| Second Embodiment | 20 × 9 × 2 | present | present | none |
| Comparative Example | — | present | — | present |

*All sizes are in a unit of mm.

From the results shown in Table 1, it is apparent that by forming the grooves 23 around the negative electrode collector $18_1$ or the negative electrode collector receiving part $18_3$ surrounding the resistance-welded portion, the particles generated by the spattering are rarely splashed into the inside or to the outside of the electrode assembly 11, so that a sealed battery 10 which is high-reliability with low occurrence of internal short-circuits can be obtained.

Additionally, in the first and second working examples, the case where both the negative electrode collector and the negative electrode collector receiving part are made of copper was described. However, copper is a metal having the highest thermal conductivity among metals commonly-used as a substrate of the electrode, so that when the present invention is applied to a case where the collector etc. are made of another metal than copper, the spattered metal particles splash more rarely to the outside. Therefore, it is apparent that according to the present invention, irrespective of the type of the sealed battery, a sealed battery which is high-reliability with low occurrence of internal short-circuits can be obtained.

In first and second working examples, shown is an example for forming the groove 23 by using a copper-made negative electrode collector $18_1$ in which a flat-surfaced protuberance $18_4$ in a cylindrical shape is formed in the central part thereof and by adhering an insulating tape layer having a predetermined thickness produced by laminating insulating tapes, surrounding the flat-surfaced protuberance $18_4$ and departing from the protuberance $18_4$ by a predetermined distance. However, in the present invention, since the groove 23 functions as a space for capturing the particles generated by the spatter, the groove 23 may be formed directly in the negative electrode collector $18_1$ or the negative electrode collector receiving part $18_3$ by cutting or pressing. By employing such a constitution, the entire wall of the groove 23 is made of a metal and consequently, the particles generated by the spattering become unlikely to splash, so that a sealed battery which is higher-reliability with lower occurrence of internal short-circuits becomes able to be obtained. A state of the welded portion when the resistance-welding was performed using a sealed battery in which the groove 23 was formed directly in the negative electrode collector $18_1$ by cutting, is shown in FIG. 5. Here, FIG. 5 shows schematically the form of a molten portion 25 formed at the resistance-welded portion after the resistance-welding and the existing state of spattered particles 26.

In the first and second working examples, though the protuberance $18_2$ of the negative electrode collector receiving part $18_3$ which functions as a projection has a shape in which the cross section area of the tip portion is smaller than that of the base portion, the shape of the protuberance $18_2$ is not limited to this shape. Here, the protuberance $18_2$ is not an essential constitution, however, when this protuberance $18_2$ is provided, the generation of the spattered particles becomes more rarely, which is more preferred.

In addition, in the above-described embodiments, the examples using a prismatic outer packaging can are described, the shape of the outer packaging can is not particularly limited and the present invention is also applicable to a sealed battery using an outer packaging can having a cylindrical shape. However, taking into consideration the space efficiency of the instrument incorporating batteries, it is more preferred to use an outer packaging can having a prismatic shape. In addition, though in the above-described embodiments, the examples using a flat-shaped wound electrode assembly are described, it is apparent that the present invention is applicable also to an electrode assembly produced by laminating plate-shaped positive electrode and negative electrode plates through the separator.

What is claimed is:

1. A sealed battery comprising:
    a wound electrode assembly made up of positive electrode plate and negative electrode plate wound with separator;
    a rectangular outer case having a mouth portion for housing the wound electrode assembly;
    a sealing plate for sealing a mouth portion of the rectangular outer can;
    wherein
    the wound electrode assembly is housed in the rectangular outer can such that a direction of a winding axis of the wound electrode assembly is approximately parallel with the sealing plate;
    the wound electrode assembly is flat-shape and has wound positive electrode substrate exposed portion at one end and wound negative electrode substrate exposed portion at the other end;
    a positive electrode collector is connected to the wound positive electrode substrate exposed portion and a negative electrode collector is connected to the wound negative electrode substrate exposed portion;
    the wound negative electrode substrate exposed portion has narrow part and wide parts formed on both sides of the narrow part, the wide parts are wider than the narrow part;
    the negative electrode collector includes a first area, a second area and a third area;
    the first area of the negative electrode collector is placed in approximate-parallel with and welding-connected to one outermost surface of the narrow part of the wound negative electrode substrate exposed portion;
    the second area of the negative electrode collector is placed in approximate-parallel with a side wall of the rectangular outer can, placed between one of the wide parts of the wound negative electrode substrate exposed portion and a side wall of the rectangular outer can, and extended to be closer to the sealing plate than is the end of the wound negative electrode substrate exposed portion which is closest to the the sealing plate;
    the second area of the negative electrode collector being closer to a side of the side wall of the rectangular outer can than is the first area;
    the third area of the negative electrode collector connects the first area with the second area;
    a rib is formed in the first area of the negative electrode collector and at an end of a central side of the wound electrode assembly.

2. The sealed battery according to claim 1, wherein a negative electrode collector receiving part is welding-connected to the other outermost surface of the narrow part of the wound negative electrode substrate exposed portion.

3. The sealed battery according to claim 1, wherein the rib is formed in the negative electrode collector receiving part and at the end of the central side of the wound electrode assembly.

4. The sealed battery according to claim 1, wherein the negative electrode collector includes a fourth area, the fourth area is placed in approximate-parallel with the sealing plate.

5. The sealed battery according to claim 1, wherein an insulating tape is placed between the negative electrode collector and the one outer most surface of the narrow part of the wound negative electrode substrate exposed portion.

* * * * *